US011202068B2

United States Patent
Chen et al.

(10) Patent No.: US 11,202,068 B2
(45) Date of Patent: Dec. 14, 2021

(54) METHOD AND APPARATUS OF CONSTRAINED CROSS-COMPONENT ADAPTIVE LOOP FILTERING FOR VIDEO CODING

(71) Applicant: MEDIATEK INC., Hsinchu (TW)

(72) Inventors: Ching-Yeh Chen, Hsinchu (TW);
Olena Chubach, San Jose, CA (US);
Tzu-Der Chuang, Hsinchu (TW);
Chih-Wei Hsu, Hsinchu (TW);
Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/021,050

(22) Filed: Sep. 15, 2020

(65) Prior Publication Data

US 2021/0084295 A1    Mar. 18, 2021

Related U.S. Application Data

(60) Provisional application No. 62/956,356, filed on Jan. 2, 2020, provisional application No. 62/954,024, filed on Dec. 27, 2019, provisional application No. 62/940,321, filed on Nov. 26, 2019, provisional application No. 62/900,702, filed on Sep. 16, 2019.

(51) Int. Cl.
*H04N 19/117*    (2014.01)
*H04N 19/186*    (2014.01)
*H04N 19/82*    (2014.01)

(52) U.S. Cl.
CPC ........ *H04N 19/117* (2014.11); *H04N 19/186* (2014.11); *H04N 19/82* (2014.11)

(58) Field of Classification Search
CPC .......................... H04N 19/117; H04N 19/186
USPC .......................................................... 375/240
See application file for complete search history.

(56) References Cited

U.S. PATENT DOCUMENTS

| | | | |
|---|---|---|---|
| 2011/0274158 A1 | 11/2011 | Fu et al. | |
| 2018/0192050 A1* | 7/2018 | Zhang | ................... H04N 19/80 |
| 2019/0028717 A1 | 1/2019 | Budagavi | |
| 2021/0006784 A1* | 1/2021 | Lim | ................... H04N 19/117 |

OTHER PUBLICATIONS

International Search Report and Written Opinion dated Dec. 14, 2020, issued in application No. PCT/CN2020/115570.
Misra, K. et al.; "Cross-Component Adaptive Loop Filter for chroma;" Joint Video Experts Team (JVET) of ITU-T SG 16 WP 3 and ISO/IEC JTC 1/SC 29/WG 11; Jul. 2019; pp. 1-9.

* cited by examiner

*Primary Examiner* — Amir Shahnami
(74) *Attorney, Agent, or Firm* — McClure, Qualey & Rodack, LLP

(57) ABSTRACT

Methods and apparatus for cross-colour loop-filter processing of reconstructed video are disclosed. According to one method, a sum of filter coefficients for each of one or more candidate cross-colour loop filters is constrained to be a fixed value. One or more syntax elements indicating a value related to a total number of candidate filters in a filter set are signalled or parsed in the APS (Adaptation Parameter Set).

9 Claims, 8 Drawing Sheets

$c2' = c2 + c0$ $c5' = c5 + c1$
$c6' = c6 + c2 + c0$
$c7' = c7 + c3$ $c10' = c10 + c4 + c8$
$c11' = c11 + c5 + c7 + c1 + c3$
$c12' = c12 + 2*c6 + 2*c2 + 2*c0$

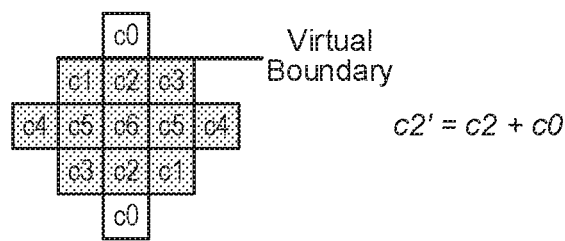 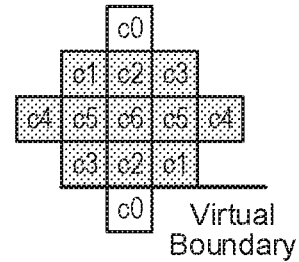
*Fig. 5A*  *Fig. 5B*
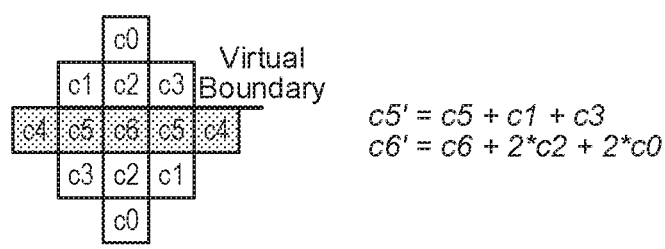 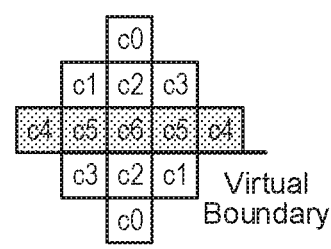
*Fig. 5C*  *Fig. 5D*
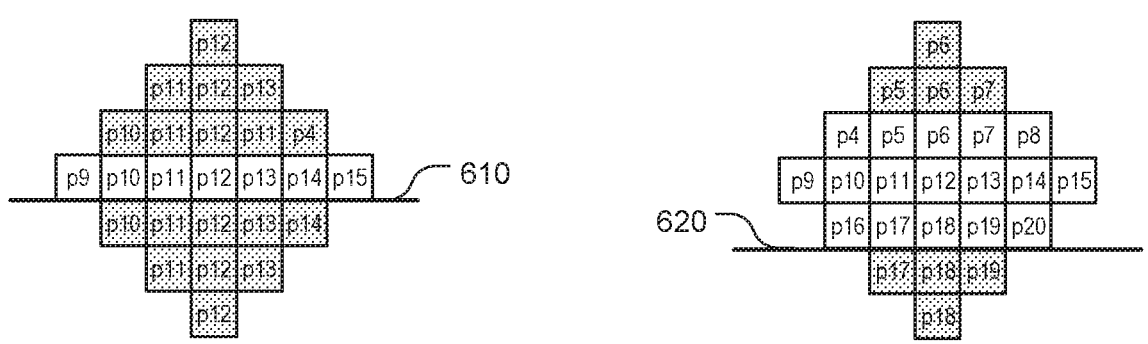
*Fig. 6A*  *Fig. 6B*
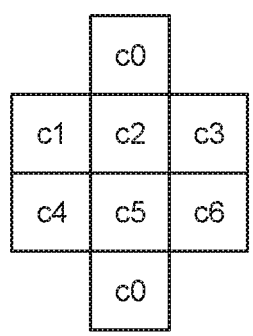
*Fig. 7*

METHOD AND APPARATUS OF CONSTRAINED CROSS-COMPONENT ADAPTIVE LOOP FILTERING FOR VIDEO CODING

CROSS REFERENCE TO RELATED APPLICATIONS

The present invention claims priority to U.S. Provisional Patent Application, Ser. No. 62/900,702, filed Sep. 16, 2019, U.S. Provisional Patent Application, Ser. No. 62/940,321, filed Nov. 26, 2019, U.S. Provisional Patent Application, Ser. No. 62/954,024, filed Dec. 27, 2019 and U.S. Provisional Patent Application, Ser. No. 62/956,356, filed Jan. 2, 2020. The U.S. Provisional Patent Applications are hereby incorporated by reference in their entireties.

FIELD OF THE INVENTION

The present invention relates to adaptive loop filter (ALF) processing in a video coding system. In particular, the present invention relates to constraining Cross-Component ALF processing in a video encoder or decoder.

BACKGROUND

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, Intra-coding is also adaptively applied, where the picture is processed without reference to any other picture. The inter-predicted or Intra-predicted residues are usually further processed by transformation, quantization, and entropy coding to generate a compressed video bitstream. During the encoding process, coding artefacts are introduced, particularly in the quantization process. In order to alleviate the coding artefacts, additional processing has been applied to reconstructed video to enhance picture quality in newer coding systems. The additional processing is often configured in an in-loop operation so that the encoder and decoder may derive the same reference pictures to achieve improved system performance.

FIG. 1A illustrates an exemplary adaptive Inter/Intra video coding system incorporating in-loop processing including adaptive loop filter (ALF). For Inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In video coding systems, various in-loop filters such as Deblocking Filter (DF) 130, Sample Adaptive Offset (SAO) 131 and Adaptive Loop Filter (ALF) 132 have been used to enhance picture quality.

A corresponding decoder for the encoder of FIG. 1A is shown in FIG. 1B. The video bitstream is decoded by Entropy Decoder 142 to recover the transformed and quantized residues. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130, SAO 131 and ALF 132 to produce the final enhanced decoded video.

Cross-Component ALF Processing

In JVET-O0636 (Kiran Misra, et al., "Cross-Component Adaptive Loop Filter for chroma", Joint Video Experts Team (JVET) of ITU-T SG 16 WP 3 and ISO/IEC JTC 1/SC 29/WG 11, 15th Meeting: Gothenburg, SE, 3-12 Jul. 2019, Document: JVET-O0636), Cross-Component Adaptive Loop Filter (CC-ALF) is proposed. CC-ALF makes use of luma sample values to refine each chroma component. FIG. 2A illustrates the structure of CC-ALF with respect to the other loop filters according to JVET-O0636. In FIG. 2A, the ALF processing is performed after respective SAO (210, 212 and 214). In a conventional video coding system, only ALF Luma 220 and ALF Chroma 230 are used. In JVET-O0636, two additional ALF filters, i.e., CC ALF Cb 222 and CC ALF Cr 224 are used to derive adjustment signals to add to ALF processed Cb and Cr using adders 240 and 242 respectively.

CC-ALF operates by applying a linear, diamond shaped filter to the luma channel for each chroma component as shown in FIG. 2B according to JVET-O0636. The filter coefficients are transmitted in the APS, scaled by a factor of $2^{10}$, and rounded for fixed point representation. The application of the filters is controlled on a variable block size and signalled by a context-coded flag received for each block of samples. The block size along with a CC-ALF enabling flag is received at the slice-level for each chroma component. Syntax and semantics for CC-ALF are also disclosed in JVET-O0636.

As mentioned above, CC-ALF operates by applying a linear, diamond shaped filter to the luma channel for each chroma component. FIG. 2C illustrates an example of placement of CC-ALF 250 with respect to luma samples. The legend 260 of the symbols is shown, where an empty circle indicates a luma sample and a circle filled with hatched lines indicates a chroma sample. For example, the diamond-shaped filters 253 and 255 are shown for chroma samples 252 and 254 respectively. Filter coefficient dynamic range is limited to 6-bit signed value. Filter selection is performed at the CTU level with support for a maximum of 4 filters. Symmetric line selection is used at virtual boundary (to better harmonize with ALF). Temporal layer coefficient buffers are not used (to better harmonize with the APS concept). Residual output is clipped −2BitDepthC−1 to 2BitDepthC−1−1, inclusive.

The application of the filters is controlled on a variable block size and signalled by a context-coded flag received for each block of samples. The block size along with a CC-ALF enabling flag is received at the slice-level for each chroma component. Syntax and semantics for CC-ALF are provided in the Appendix. In the contribution the following block sizes (in chroma samples) were supported 16×16, 32×32, 64×64, 128×128.

Virtual Boundaries to Reduce Line Buffer Usage

In order to eliminate the line buffer requirements of SAO and ALF, we introduce the concept of virtual boundary (VB). As shown in FIG. 3, VBs are upward shifted horizontal largest coding unit (LCU) boundaries by N lines. For each LCU, SAO and ALF can process lines above the VB before the lower LCU comes but cannot process lines below the VB until the lower LCU comes, which is caused by DF. With consideration of the DF in HM-4.0, the space between the proposed VB and the horizontal LCU boundary is set as three lines for luma (i.e. N=3 in FIG. 3) and one line for chroma (i.e. N=1 in FIG. 3). SAO and ALF are modified to ensure that every to-be-processed position on one side of a VB does not require any data access from the other side of the VB unless the data can become available in time without using any additional line buffer.

In JVET 11-th meeting, ALF with 4×4 block-based adaptation is adopted in the draft of the next generation video coding standard, Versatile Video Coding (VVC). For one 4×4 block, one 8×8 window is required to calculate the block property and the filter footprint is one 7×7 diamond filter for luma and one 5×5 diamond filter for chroma. Therefore, the required line buffer without virtual boundaries is additional 7 luma line buffer and 3 chroma line buffer on top of 4 luma DF line buffer and 2 chroma DF line buffer. The concept of virtual boundaries can still be applied in VVC to reduce the line buffer usage. In the above description, largest coding unit (LCU) is renamed as coding tree unit (CTU) in VVC. However, some modifications are proposed to fit the features of current ALF design.

Non-Linear ALF Operations

In VTM3.0 (VVC (Versatile Video Coding) Test Model Ver. 3.0), the filtering process of the Adaptive Loop Filter, is performed as follows:

$$O(x,y)=\Sigma_{(i,j)}w(i,j)\cdot l(x+i,y+j), \quad (1)$$

In the above equation, samples l(x+i, y+j) are input samples, O(x, y) is the filtered output sample (i.e. filter result), and w(i, j) denotes the filter coefficients. Since the ALF is applied to the reconstructed samples, samples l(x+i, y+j) correspond to reconstructed samples. The center reconstructed position at a center location of the ALF processing corresponds to (i, j)=(0, 0), i.e., I(i, j). In practice, in VTM3.0, it is implemented using integer arithmetic for fixed point precision computations:

$$O(x,y) = \left( \sum_{i=-\frac{L}{2}}^{\frac{L}{2}} \sum_{j=-\frac{L}{2}}^{\frac{L}{2}} w(i,j) \cdot I(x+i, y+j) + 64 \right) \gg 7, \quad (2)$$

In the above equation, L denotes the filter length, and where w(i,j) are the filter coefficients in fixed point precision.

Equation (1) can be reformulated, without coding efficiency impact, in the following expression:

$$O(x,y)=l(x,y)+\Sigma_{(i,j)\neq(0,0)}w(i,j)\cdot(l(x+i,y+j)-l(x,y)). \quad (3)$$

In the above equation, w(i, j) are the same filter coefficients as in equation (1) except for w(0, 0), which is equal to 1 in equation (3) while it is equal to $(1-\Sigma_{(i,j)\neq(0,0)} w(i,j))$ in equation (1).

Using the above filter formula of equation (3), we can easily introduce nonlinearity to make ALF more efficient by using a simple clipping function to reduce the impact of neighbor sample values (l(x+i, y+j)) when they are very different from the current sample value (l(x, y)) being filtered.

In JVET-M0385 ((J. Taquet, et al., "*Non-Linear Adaptive Loop Filter*", in Joint Video Exploration Team (JVET) of ITU-T SG 16 WP 3 and ISO/IEC JTC 1/SC 29/WG 11, 13th Meeting: Marrakech, MA, 9-18 Jan. 2019, Document: JVET-M0385)), a non-linear ALF is disclosed. It introduces an adaptive clipping operation on the input samples values of the Adaptive Loop Filter in test software VTM3.0. The goal of this adaptive clipping is to introduce some non-linearities to limit the difference between the input sample value to be filtered and the other neighbor input sample values of the filter.

According to JVET-M0385, the ALF filter operation is modified as follows:

$$O'(x,y)=l(x,y)+\Sigma_{(i,j)\neq(0,0)}w(i,j)\cdot K(l(x+i,y+j)-l(x,y),k(i,j)), \quad (4)$$

In the above equation, O'(x,y) corresponds to the modified ALF filter output, I(x,y) corresponds to sample before ALF, K(d, b)=min(b, max(−b, d)) is the clipping function, and k(i, j) are clipping parameters, which depend on filter coefficient at the (i, j). The encoder performs the optimization to find the best k(i, j).

In the implementation according to JVET-M0385, the clipping parameters k(i, j) are specified for each ALF filter, where one clipping value is signaled per filter coefficient. It means that 12 clipping values are signaled in the bitstream per Luma filter and 6 clipping values for the Chroma filter.

In order to limit the signaling cost and the encoder complexity, the clipping values are limited to a small set of possible values in JVET-M0385. Furthermore, only 4 possible values are used for Inter slices and 3 possible values are used for Intra slices.

Because the variance of the local differences is often higher for Luma than for Chroma, two different sets are used for the Luma and Chroma filters. Furthermore, the maximum sample value is included in each set, so that clipping can be disabled if it is not necessary.

The proposed sets of clipping values according to JVET-M0385 are provided in Table 1.

TABLE 1

| | Allowed clipping values | |
|---|---|---|
| | INTRA | INTER |
| LUMA | { 10, 102, 1024 } | { 6, 32, 181, 1024 } |
| CHROMA | { 4, 24, 1024 } | { 4, 25, 161, 1024 } |

The clipping values are encoded in the slice header using a Golomb encoding corresponding to the index of the clipping value in the set.

Reduced Buffer Requirement for ALF Using Virtual Boundary

In JVET-M0301 ((A. Kotra, et al., "Non-CE: Loop filter line buffer reduction", in Joint Video Exploration Team (JVET) of ITU-T SG 16 WP 3 and ISO/IEC JTC 1/SC 29/WG 11, 13th Meeting: Marrakech, MA, 9-18 Jan. 2019, Document: JVET-M0301), a mechanism of reducing the line buffer requirement of ALF (adaptive loop filter) is disclosed. The contribution uses the concept of virtual boundaries (VBs) which are upward shifted horizontal CTU boundaries by "N" samples. Modified ALF block classification and modified ALF filtering are applied for the samples which are near the virtual boundary to reduce the number of line buffers required. Modified ALF block classification only uses the samples that are above the VB to classify the given 4×4 block, which is above VB. Similarly for the classification of the 4×4 block below VB, samples belonging to the lines below the VB are used. Modified ALF filtering uses a combination of conditional disabling and truncated versions of the original ALF filter.

Truncated ALF Filtering at Virtual Boundaries

Truncated version of the filters are used for filtering of the Luma samples belonging to the lines close to the virtual boundaries. These truncated versions of the filters can be used for both N=4 and N=6 cases. Similarly, truncated version of the filters are also used for chroma ALF filtering.

For the truncated ALF, the coefficients have to be normalized, i.e., the sum of remaining coefficients have to be the same as the sum of original coefficients. FIGS. 4A-F illustrate examples of coefficient normalization for truncated luma ALF filter processing at the virtual boundary. FIG. 4A illustrates the modified ALF coefficient for the case that the top position (i.e., position c0) is outside the virtual boundary. Coefficient c2 is modified to c2', where $c2'=c2+c0$. FIG. 4B illustrates the case that the bottom position (i.e., c0) is outside the virtual boundary. FIG. 4C illustrates the modified ALF coefficients for the case that the top two rows (i.e., positions c0, c1, c2 and c3) are outside the virtual boundary. Therefore, coefficients c5, c6 and c7 are modified to c5', c6' and c7', where $c5'=c5+c1$, $c6'=c6+c2+c0$, and $c7'=c7+c3$. FIG. 4D illustrates the modified ALF coefficients for the case that the bottom two rows (i.e., positions c0, c1, c2 and c3) are outside the virtual boundary. FIG. 4E illustrates the modified ALF coefficients for the case that the top three rows (i.e., positions c0 through c8) are outside the virtual boundary. Therefore, coefficients c10, c11 and c12 are modified to c10', c11' and c12', where $c10'=c10+c4+c8$, $c11'=c11+c5+c7+c1+c3$ and $c12'=c12+2*c6+2*c2+2*c0$. FIG. 4F illustrates the modified ALF coefficients for the case that the bottom three rows (i.e., positions c0 through c8) are outside the virtual boundary.

FIGS. 5A-D illustrates examples of truncated chroma ALF filter processing at the virtual boundary. FIG. 5A illustrates the modified ALF coefficient for the case that the top position (i.e., position c0) is outside the virtual boundary. Coefficient c2 is modified to c2', where $c2'=c2+c0$. FIG. 5B illustrates the case that the bottom position (i.e., c0) is outside the virtual boundary. FIG. 5C illustrates the modified ALF coefficient for the case that the top two rows (i.e., positions c0, c1, c2 and c3) are outside the virtual boundary. Therefore, coefficients c5 and c6 are modified to c5' and c6', where $c5'=c5+c1+c3$ and $c6'=c6+2*c2+2*c0$. FIG. 5D illustrates the modified ALF coefficients for the case that the bottom two rows (i.e., positions c0, c1, c2 and c3) are outside the virtual boundary.

In this application, various other ALF boundary issues are addressed and solutions to improve performance, to unify multiple systems or to simply ALF boundary process are disclosed.

BRIEF SUMMARY OF THE INVENTION

Methods and apparatus for loop-filter processing of reconstructed video are disclosed. According to one method, reconstructed samples are received. A target CCALF (Cross-Colour Adaptive Loop Filter) is determined, wherein the target CCALF belongs to a filter set comprising one or more candidate filters and a sum of filter coefficients for each candidate filter, in said one or more candidate filters, is constrained to be a fixed value. The target CCALF is applied to the related reconstructed luma samples to generate a CCALF filtered chroma sample for a target reconstructed chroma sample. A final filtered chroma sample is generated by combining the CCALF filtered chroma sample and a regular ALF filtered chroma sample, wherein the final filtered chroma sample is used as a video decoding output or used for further video encoding or decoding process.

In one embodiment, the fixed value is equal to 0. In another embodiment, when a number of unique filter coefficients for each candidate filter is equal to M, only (M−1) filter coefficients for each candidate filter are decoded at a decoder side, and wherein the M is an integer greater than 1. In one embodiment, one filter coefficient, other than the (M−1) filter coefficients, is not decoded at the decoder side or is encoded at an encoder side, and the un-coded filter coefficient corresponds to any selected coefficient among the unique filter coefficients for each candidate filter.

According to another method, one or more syntax element are signalled in APS (Adaptation Parameter Set) of a video bitstream at an encoder side or said one or more syntax elements are parsed in the APS of the video bitstream at a decoder side, wherein said one or more syntax elements indicate a value related to a total number of candidate filters in a filter set. A target CCALF (Cross-Colour Adaptive Loop Filter) is determined, wherein the target CCALF belongs to a filter set comprising one or more candidate filters and a sum of filter coefficients for each of said one or more candidate filters is constrained to be a fixed value. The target CCALF is applied to the related reconstructed luma samples to generate a CCALF filtered chroma sample for a target reconstructed chroma sample. A final filtered chroma sample is generated by combining the CCALF filtered chroma sample and a regular ALF filtered chroma sample, wherein the final filtered chroma sample is used as a video decoding output or used for further video encoding or decoding process.

In one embodiment, one syntax element is signalled or parsed for each colour component. In one embodiment, said one or more syntax elements comprise a value corresponding to the total number of candidate filters in the filter set minus 1.

BRIEF DESCRIPTION OF THE DRAWINGS

FIG. 4A illustrates the modified ALF coefficient for the case that the top position is outside the virtual boundary; FIG. 4B illustrates the case that the bottom position is outside the virtual boundary; FIG. 4C illustrates the modified ALF coefficients for the case that the top two rows are outside the virtual boundary; FIG. 4D illustrates the modified ALF coefficients for the case that the bottom two rows are outside the virtual boundary; FIG. 4E illustrates the modified ALF coefficients for the case that the top three rows are outside the virtual boundary; and FIG. 4F illustrates the modified ALF coefficients for the case that the bottom three rows are outside the virtual boundary.

FIGS. 5A-D illustrates examples of truncated chroma ALF filter processing at the virtual boundary, where FIG. 5A illustrates the modified ALF coefficient for the case that the top position is outside the virtual boundary; FIG. 5B illustrates the case that the bottom position is outside the virtual boundary; FIG. 5C illustrates the modified ALF coefficients for the case that the top two rows are outside the virtual boundary; and FIG. 5D illustrates the modified ALF coefficients for the case that the bottom two rows are outside the virtual boundary.

FIGS. 6A-B illustrate examples of the symmetric 2-side padding method, where FIG. 6A illustrates the example that three rows are below the slice/brick/virtual boundary or the 360-degree virtual boundary; and FIG. 6B illustrates the example that two rows are below the slice/brick/virtual boundary or the 360-degree virtual boundary.

FIG. 7 illustrates an example of 3×4 diamond-shaped CCALF with coefficients c0 through c6.

DETAILED DESCRIPTION OF THE INVENTION

Figure 1A:
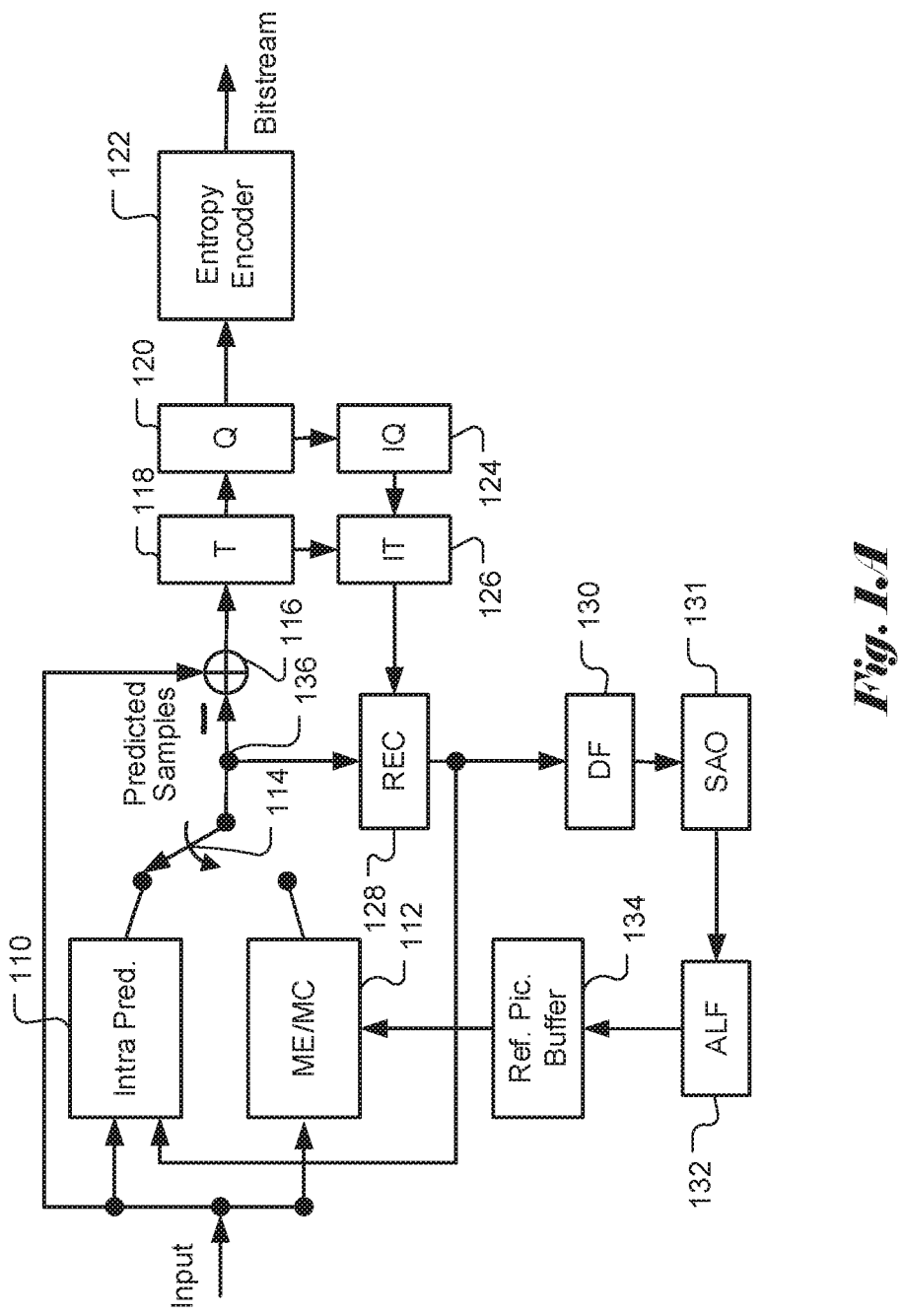
FIG. 1A illustrates an exemplary adaptive Inter/Intra video encoding system incorporating DF, SAO and ALF in-loop processing.
Figure 1B:
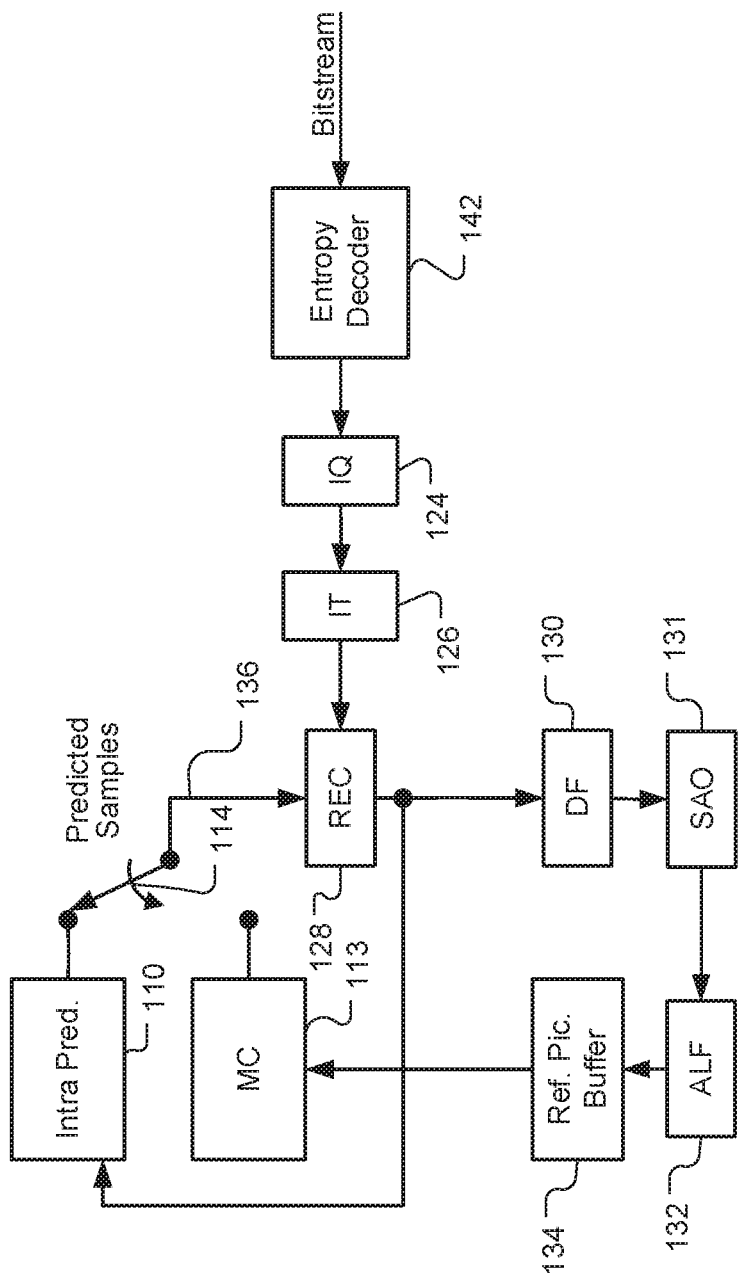
FIG. 1B illustrates an exemplary adaptive inter/intra video decoding system incorporating DF, SAO and ALF in-loop processing.
Figure 2A:
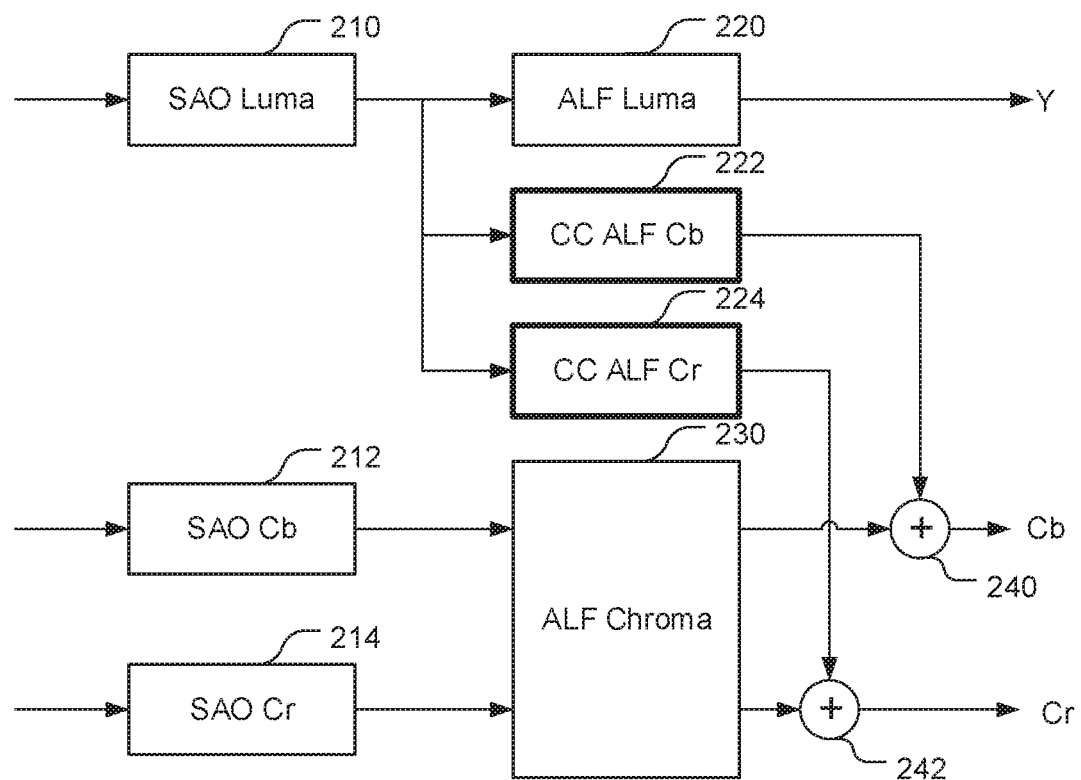
FIG. 2A illustrates the structure of CC-ALF with respect to the other loop filters according to JVET-O0636 where the ALF processing is performed after respective SAO.
Figure 2B:
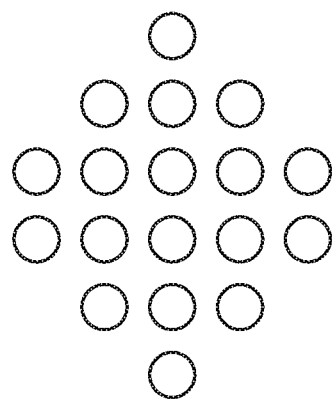
FIG. 2B illustrates the diamond shaped filter applied to the luma channel for each chroma component according to JVET-O0636.
Figure 2C:
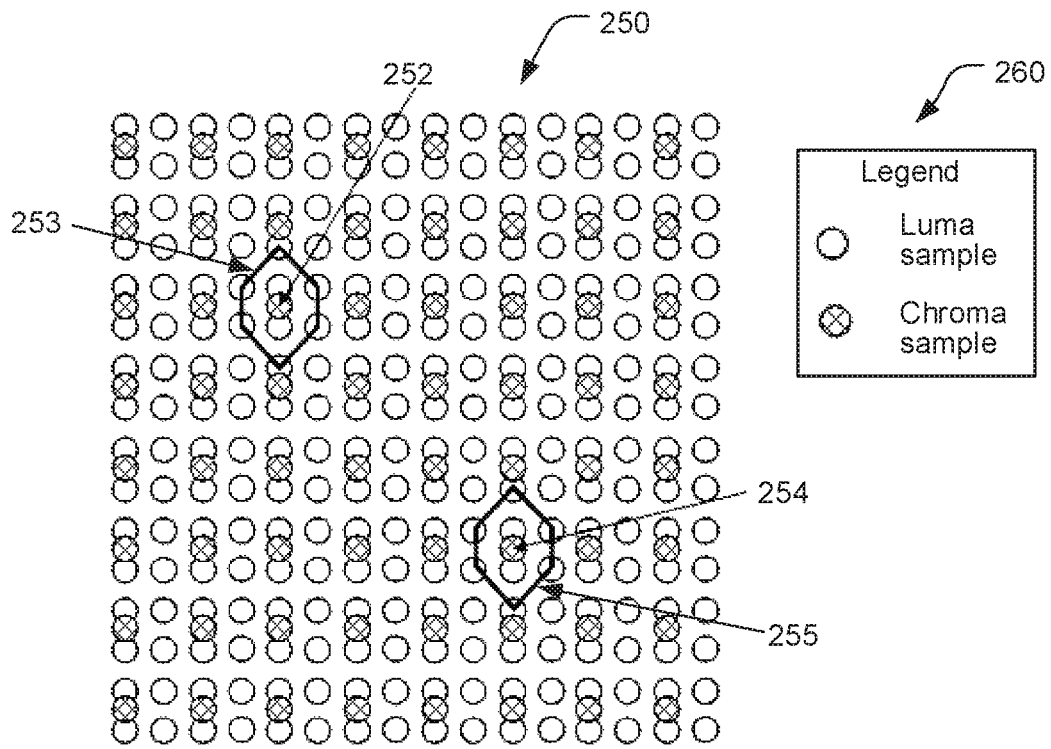
FIG. 2C illustrates an example of placement of CC-ALF 250 with respect to luma samples.
Figure 3:
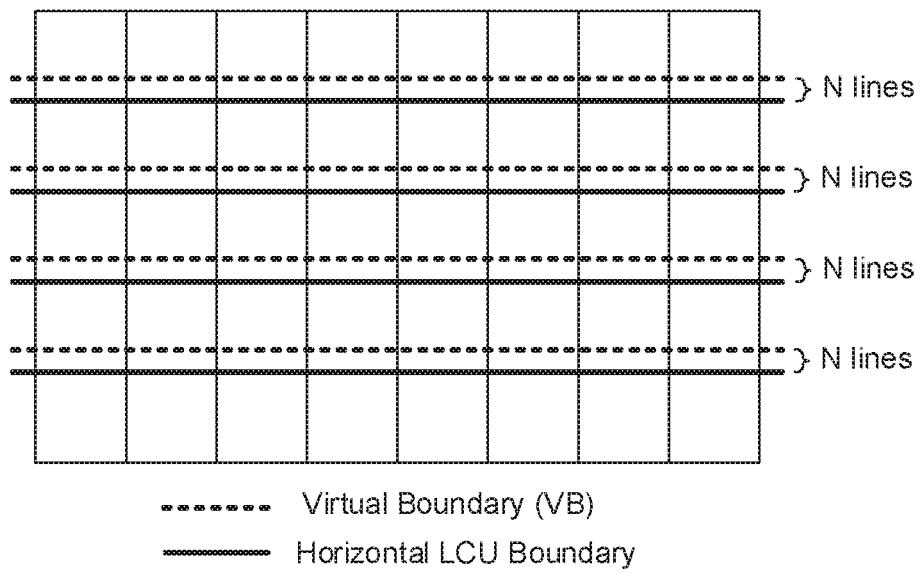
FIG. 3 illustrates an example of VBs by upward shifting horizontal LCU boundaries by N lines.
Figure 4A:
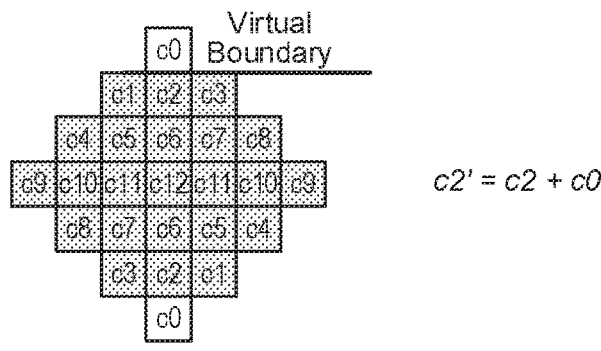
FIGS. 4A-F illustrate examples of coefficient normalization for truncated luma ALF filter processing at the virtual boundary, where
Figure 4B:
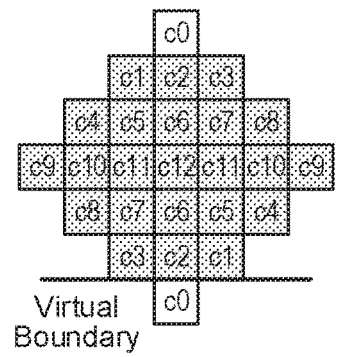
Figure 4C:
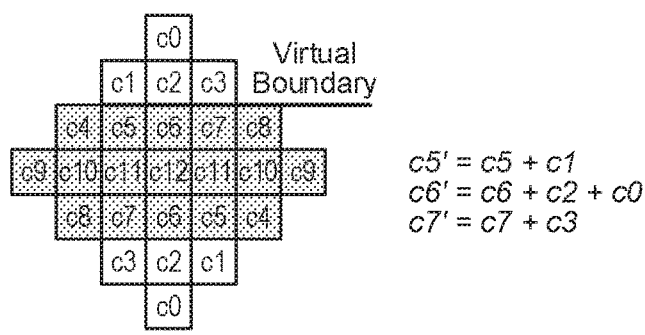
Figure 4D:
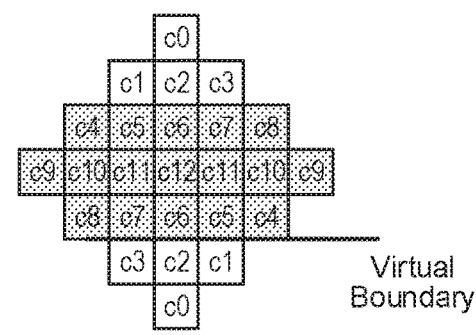
Figure 4E:
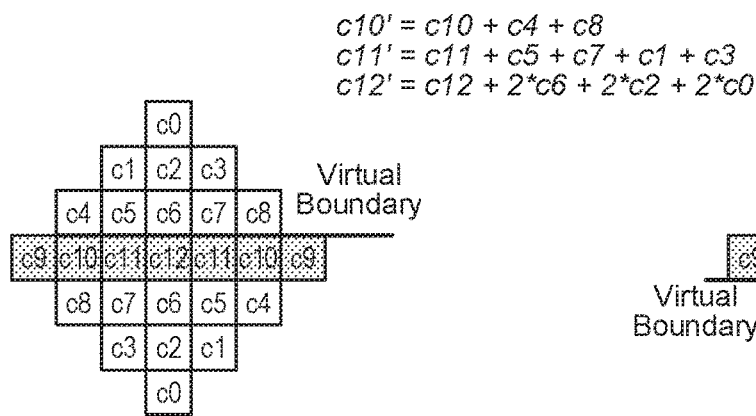
Figure 4F:
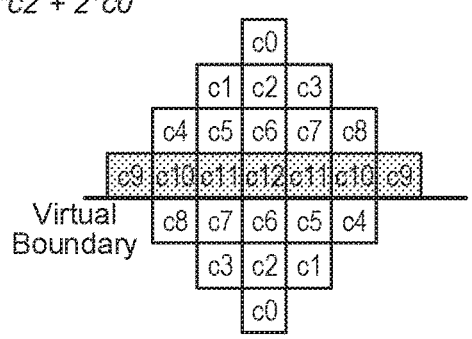

The following description is of the best-contemplated mode of carrying out the invention. This description is made for the purpose of illustrating the general principles of the invention and should not be taken in a limiting sense. The scope of the invention is best determined by reference to the appended claims.

Method 1: Corresponding Luma Samples in CC-ALF

In CC-ALF, one additional filter is added for chroma component and the filtered output will be the weighted sum of the original chroma filter and the additional filter. If the video format is YUV444 or RGB444, then the corresponding luma sample of to-be-processed chroma samples is well-defined by using the same spatial position in different colour components. However, if the video format is YUV420 or YUV444, then the definition of corresponding luma sample in CC-ALF is one issue. In one embodiment, the corresponding luma sample is down-sampled according to YUV format or the sampling positions of chroma. For example, if the video format is YUV420 and the sampling position of chroma is (0, 0.5) in terms of luma position, then the corresponding luma sample can be one among four luma samples. In another example, the corresponding luma sample can be the average of the left two luma samples. In another example, the corresponding luma sample can be the average of the left (right) top and bottom luma samples. In another case, the corresponding luma sample can be the average of the four luma samples. The filter footprint can be defined in terms of chroma position or luma position. If the filter footprint is defined in terms of chroma samples position, then the inputs of CC-ALF filtering process are the corresponding luma samples mentioned in the above. If the filter footprint is defined in terms of luma samples position, then the center position of the filter-shape in CC-ALF is defined by the corresponding luma sample of to-be-processed chroma sample. In one embodiment, the definition of the corresponding luma sample is dependent on video format or the sampling position of chroma component.

In another embodiment, non-linear clipping operation can be applied to CC-ALF. In yet another embodiment, the difference between neighboring samples and to-be-processed sample is used in the filtering process instead of using the neighboring samples directly. The to-be-processed sample can be the sample value in the chroma component, or the sample value of the corresponding luma sample in CC-ALF.

In current design, the output of chroma ALF will be clipped into one valid range (e.g. [0, 1023] for 10 bits video compression and [0, 255] for 8 bits video compression). The output of CCALF will be added on top of this clipped value and the clipping operation will be performed again to guarantee the final output within the valid range. Therefore, there are two clipping operations. One is applied to the output of chroma ALF, and the other is applied to the output of CCALF. In one embodiment, the clipping operation used to constrain the output value within the valid range in the chroma ALF process can be discarded when the CC-ALF is applied, and thus, clipping operation is applied only after the CC-ALF output is added to the output of chroma ALF.

In another embodiment, the precision of filter coefficients in the additional filter in CC-ALF is aligned with the original ALF design.

In one embodiment, the filter shape of CC-ALF is aligned with the filter shape of the luma ALF filter. In one embodiment, CC-ALF filter can have 25 taps with 23 coefficients, where the most top and most bottom coefficients are equal and the most left and the most right coefficients are equal. In one embodiment, CC-ALF filter can have 25 taps with 22 coefficients, where the most top, most bottom, most left and most right coefficients are all equal. In one embodiment, CC-ALF filter is symmetry is aligned to the ALF filter symmetry. In one embodiment, when the filter shapes of CCALF and luma ALF are the same, then the boundary processes of CCALF, including ALF virtual boundary process, ALF boundary process at slice boundaries/brick boundaries/tile boundaries/360 face virtual boundaries/sub-picture boundaries/picture boundaries are the same as those of luma ALF.

In one embodiment, the filter shape of the CC-ALF can be aligned with the filter shape of the chroma ALF filter. In one embodiment, CC-ALF filter can have 13 taps with 11 coefficients, where the top and bottom coefficients are equal and left and right coefficients are equal. In one embodiment, CC-ALF filter can have 13 taps with 10 coefficients, where the top, bottom, left and right coefficients are all equal. In one embodiment, CC-ALF filter is symmetric, similar to the ALF filter, and thus, it contains 13 taps and only 7 coefficients. In one embodiment, when the filter shapes of CCALF and chroma ALF are the same, then the boundary processes of CCALF, including ALF virtual boundary process, ALF boundary process at slice boundaries/brick boundaries/tile boundaries/360 face virtual boundaries/sub-picture boundaries/picture boundaries are the same as those of chroma ALF.

In one embodiment, the CC-ALF filter is shared between chroma U and chroma V color components. In one embodiment, only one alf_crosscomponent_cbcr_filter_signal_flag is present in APS. In one example, if this flag is present, CC-ALF coefficients are present in APS and can be decoded.

In one embodiment, CC-ALF coefficients for chroma U are defined from luma component, and can be reused for chroma V. In one embodiment, CC-ALF coefficients for chroma V are defined from luma component, and can be reused for chroma U. In one embodiment, the CC-ALF coefficients for chroma V can be obtained from the CC-ALF coefficients for chroma U, by additional coding of sign and/or bit-shift information. In one embodiment, the CC-ALF coefficients for chroma U can be obtained from the CC-ALF coefficients for chroma V, by additional coding of sign and/or bit-shift.

In one embodiment, CC-ALF can be applied to only one of the chroma components. In one example, a flag can be explicitly signalled at CTB level, or CU level, or block level, indicating whether one or both chroma components are using CC-ALF. In one embodiment, if not signaled, CC-ALF coefficients are inferred to be equal to zero.

In one embodiment, slice_cross_component_alf_cb_reuse_temporal_layer_filter is never signaled in slice header, meaning that the filter selection of CC-ALF must be always signaled for each slice, when CCALF is enabled. In one embodiment, only the CCALF filter coefficients stored in APS can be referenced by different slices or pictures. That is, there is no data dependency of CCALF filter coefficients between different slices or different pictures.

In another embodiment, multiple CC-ALF filters can be used in one slice/brick/tile/picture. When multiple CC-ALF filters are used, the selection of multiple CC-ALF filters can be explicitly signalled at CTB level, or CU level, or block level. In another embodiment, the selection of multiple CC-ALF filters can be implicitly derived according to the selection of multiple chroma filters. When multiple CC-ALF filters are used, they can be signalled independently in one APS or coupled with multiple chroma filters. For example, two sets of multiple filters, one for CC-ALF and the other for chroma filters, are separately signalled in one APS. Or in another case, only one set of multiple filters is signalled in one APS, and each candidate in this set include one of chroma filter and CC-ALF filter at least.

In another embodiment, the chroma ALF filter and CC-ALF filter cannot be used at the same time. That is, for each to-be-processed chroma sample, only one of chroma ALF filter and CC-ALF filter can be applied at most. In one embodiment, the filter shape of these two filters can be further unified. In another embodiment, one flag is signalled for each filter to indicate which the filter type is chroma ALF filter or CC-ALF filter, after one on/off flag is signalled and the on/off flag indicates one of chroma ALF filter and CC-ALF filter is applied. In one embodiment, one flag used to indicate chroma ALF filter is enabled is signalled first, and if this flag is equal to one, then chroma ALF filter is applied. If this flag is false, then one additional flag used to indicate CCALF filter is enabled or not is signalled. If the flag is true, then CCALF filter is used. Otherwise, no filter is applied. In another embodiment, one flag used to indicate CC-ALF filter is enabled is signalled first, and if this flag is equal to one, then CC-ALF filter is applied. If this flag is false, then one additional flag used to indicate chroma ALF filter is enabled or not is signalled. If the flag is true, then chroma ALF filter is used. Otherwise, no filter is applied. In the above embodiments, the selection of chroma ALF filter or CC-ALF filter can be slice level, picture level, sequence level, CTB level, or block level.

In another embodiment, the proposed method is applied to luma ALF. That is, the ALF output for luma component is also affected by the corresponding chroma samples. In one example, two filters are added, and the inputs of one filter are Cb component, and the inputs of the other filter are Cr component. And the ALF output is the weighted sum of the outputs of these two additional filters and the original one. In another case, only one filter is added but the inputs of this filter is one of the combinations including Cb, Cr, and the average of Cb and Cr.

Method 2: Constrained CCALF—Sum of CCALF Coefficients is Equal to 0

According to this method, the sum of CCALF coefficients is constrained. Due to this constraint, data redundancy among CCALF coefficients is introduced and some information does not need to be transmitted. Therefore, this method can improve coding efficiency.

In CC-ALF, a linear filter is used to filter luma sample values and generate a residual correction for the chroma channels from the co-located filtered output.

In one embodiment of the present invention, the sum of the filter coefficients of all filters is limited by certain number N. In one embodiment, in order to retain chroma average values of Cb and Cr components without introducing any severe color changes in chroma, it is suggested that sum of filter taps of each CCALF filter is equal to 0. Thus, CCALF filters will have a response of 0 at DC and will eliminate all of the chroma averages.

In one embodiment, when all filter coefficients are unique, knowing the sum of all unique coefficients (N), and number of unique filter coefficients (M) at the decoder, the last unique coefficient of the filter can be determined. Thus, only M−1 unique filter coefficient has to be decoded. It is to be noted that, when filter coefficient are unique, the filter coefficients are different in values.

In one embodiment, the number of unique filter coefficients (M) in CCALF filter is less than the total number of coefficients in the filter. FIG. 7 illustrates an example of 3×4 diamond-shaped CCALF with 7 (M=7) unique coefficients c0 through c6. Total number of the filter coefficients is 8. In one embodiment, knowing the sum of all filter coefficients N, only 6 (M−1=6) coefficients c0 to c5 must be decoded, and coefficient c6 can be defined at the decoder as follows:

$$c6 = N - (2*c0 + c1 + c2 + c3 + c4 + c5).$$

In one embodiment, any one of the unique coefficients can be skipped, not just the last unique coefficient. In one embodiment, coefficient c2 is skipped and defined at the decoder. In another embodiment, coefficient c5 is skipped and defined at the decoder.

In one embodiment, it is a requirement of bitstream conformance that the last coefficient of the k-th cross component Cb filter coefficients CcAlfApsCoeffCb[adaptation_parameter_set_id][k][7] shall be in the range [−32, 31].

In one embodiment, this requirement is applied to any one coefficient of the k-th cross component Cb filter coefficients CcAlfApsCoeffCb[adaptation_parameter_set_id][k][i], where i is from 0 to the number of coefficients minus 1 in the k-th cross component Cb filter.

In one embodiment, it is a requirement of bitstream conformance that the last coefficient of the k-th cross component Cr filter coefficients CcAlfApsCoeffCr[adaptation_parameter_set_id][k][7] shall be in the range [−32, 31].

In one embodiment, this requirement is applied to any one coefficient of the k-th cross component Cr filter coefficients CcAlfApsCoeffCr[adaptation_parameter_set_id][k][i], where i is from 0 to the number of coefficients minus 1 in the k-th cross component Cr filter.

In one embodiment, this requirement is applied to all coefficients of the k-th cross component Cb/Cr filter coefficients CcAlfApsCoeffCb/Cr[adaptation_parameter_set_id][k][i], where i is from 0 to the number of coefficients in the k-th cross component Cb/Cr filter.

Method 3: Constrained CCALF—Disable CCALF in Case of Lossless and Near Lossless Coding In HEVC, in case when a CU is coded using a lossless or near lossless mode (including palette mode used for 4:4:4 content), all loop filters (i.e. SAO, ALF, DF (Deblocking Filter)) are disabled.

In the current version of VVC, when a CU is coded with lossless mode, all loop filters are disabled by encoder settings. At the same time, if a CU is coded using palette mode, SAO, ALF and DF are disabled at both encoder and decoder.

In one embodiment of the present invention, when a CU is coded using lossless or near lossless mode (including palette mode used for 4:4:4 content) all loop filters must be disabled at both, encoder and decoder.

In one embodiment, CCALF shall be disabled at both, encoder and decoder for CUs coded with lossless or near lossless modes (including palette mode used for 4:4:4 content).

In one embodiment, when a dual tree is used to partition a coding tree node (treeType is equal to DUAL_TREE_LUMA or DUAL_TREE_CHROMA), all loop filters can be disabled for luma and chroma separately (i.e, different solutions can be made for luma and chroma).

In one embodiment, when a dual tree is used to partition a coding tree node, treeType is equal to DUAL_TREE_CHROMA, and at least one of CUs (chroma CU or luma CU corresponding to this chroma CU) is coded using lossless mode, then CCALF is automatically disabled for the chroma CU.

In one embodiment, when a dual tree is not used to partition a coding tree node (i.e. treeType is equal to SINGLE_TREE), and at least one of CUs (chroma CU or luma CU corresponding to this chroma CU) is coded using lossless mode, then CCALF is automatically disabled for the chroma CU.

In one embodiment, when a dual tree is used to partition a coding tree node, treeType is equal to DUAL_TREE_CHROMA, and chroma CU is coded using lossless mode, then CCALF is automatically disabled for this chroma CU.

In one embodiment, when a dual tree is not used to partition a coding tree node, (treeType is equal to SINGLE_TREE), and chroma CU is coded using lossless mode, then CCALF is automatically disabled for this chroma CU.

In one embodiment, when a dual tree is used to partition the coding tree node (treeType is equal to DUAL_TREE_CHROMA), and both, chroma CU and a corresponding luma CU are coded using lossless mode, then CCALF is automatically disabled for chroma CU.

In one embodiment, when a dual tree is not used to partition the coding tree node (treeType is equal to SINGLE_TREE), and both, chroma CU and a corresponding luma CU are coded using lossless mode, then CCALF is automatically disabled for chroma CU.

In one embodiment, if the residual samples for both chroma components Cb and Cr are coded as a single transform block (e.g. tu_joint_cbcr_residual_flag[xC][yC]==1), and at least one of CUs (Cb or Cr) is coded using lossless mode, then CCALF is automatically disabled for both chroma CUs.

In one embodiment, if the residual samples for both chroma components Cb and Cr are coded as a single transform block (e.g. tu_joint_cbcr_residual_flag[xC][yC]==1), and at least one of CUs (Cb or Cr) is coded using lossless mode, then CCALF is automatically disabled for the corresponding chroma CU.

Method 4: Signalling the Number of Filters in CCALF

In order to know the number of CCALF filters, an additional syntax element is required to be signalled. In a conventional approach, this additional syntax element is signalled in the slice header (SH). According to another conventional approach disclosed in JVET-P1008 (K. Misra, et al., "CE5-related: On the design of CC-ALF", Joint Video Experts Team (JVET) of ITU-T SG 16 WP 3 and ISO/IEC JTC 1/SC 29/WG 11, 16th Meeting: Geneva, CH, 1-11 Oct. 2019, JVET-P1008-v2), it discloses syntax design for signalling the number of filters in CCALF, which is modified based on VVC Draft 6 (J. Chen, et al., "Cross-Component Adaptive Loop Filter for chroma", Joint Video Experts Team (JVET) of ITU-T SG 16 WP 3 and ISO/IEC JTC 1/SC 29/WG 11, 15th Meeting: Gothenburg, SE, 3-12 Jul. 2019, Document: JVET-O2001-vE). According to JVET-P1008, syntax elements alf_ctb_cross_component_cb_idc[ ][ ] and alf_ctb_cross_component_cr_idc[ ][ ] are signalled in the CTU level. Syntax element alf_ctb_cross_component_cb_idc[ ][ ] indicates whether cross component Cb filter is applied to block of Cb colour component samples. Syntax element alf_ctb_cross_component_cr_idc[ ][ ] indicates whether cross component Cr filter is applied to block of Cr colour component samples. Both syntax elements are binarized using truncated Rice (TR) code as shown in the following table:

TABLE 2

| Syntax structure | Syntax element | Binarization | |
|---|---|---|---|
| | | Process | Input parameters |
| coding_tree_unit( ) | alf_ctb_cross_component_cb_idc[ ][ ] | TR | cMax = ( slice_cross_component_cb_filters_signalled_minus1 + 1 ), cRiceParam = 0 |
| | alf_ctb_cross_component_cr_idc[ ][ ] | TR | cMax = ( slice_cross_component_cr_filters_signalled_minus1 + 1 ), cRiceParam = 0 |

In Table 2, cMax and cRiceParam are two inputs provided to the binarization process of alf_ctb_cross_component_c- b_idc[ ][ ] and alf_ctb_cross_component_cr_idc[ ][ ] using truncated Rice. The details of the binarization process is described in JVET-O2001-vE. The syntax elements slice_cross_component_cb_filters_signalled_minus1 and slice_cross_component_cr_filters_signalled_minus1 are signalled in the slice header (SH).

In JVET-P1008, some syntax elements are introduced, which are briefly reviewed as follows. slice_cross_component_alf_cb_enabled_flag specifies whether or not the cross component Cb filter is applied to Cb colour component. When slice_cross_component_alf_cb_enabled_flag is not present, it is inferred to be equal to 0.

When slice_cross_component_alf_cb_enabled_flag equal to 1, it is a requirement of bitstream conformance that, for all slices of the current picture, the ALF APS referred to by slice_cross_component_alf_cb_aps_id shall be the same. slice_cross_component_cb_filters_signalled_minus1 plus 1 specifies the number of cross component Cb filters. The value of slice_cross_component_cb_filters_signalled_minus1 shall be in the range 0 to 3.

When slice_cross_component_alf_cb_enabled_flag equal to 1, it is a requirement of bitstream conformance that slice_cross_component_cb_filters_signalled_minus1 shall be less than or equal to the value of alf_cross_component_cb_filters_signalled_minus1 in the ALF APS referred to by slice_cross_component_alf_cb_aps_id of current slice.

slice_cross_component_alf_cr_enabled_flag specifies whether or not the cross component Cr filter is applied to Cr colour component. When slice_cross_component_alf_cr_enabled_flag is not present, it is inferred to be equal to 0.

slice_cross_component_alf_cr_aps_id specifies the same as slice_cross_component_alf_cb_aps_id, but for Cr colour component of the slice refers to. When slice_cross_component_alf_cr_enabled_flag equal to 1, it is a requirement of bitstream conformance that, for all slices of the current picture, the ALF APS referred to by slice_cross_component_alf_cr_aps_id shall be the same.

slice_cross_component_cr_filters_signalled_minus1 plus 1 specifies the number of cross component Cr filters. The value of slice_cross_component_cr_filters_signalled_minus1 shall be in the range 0 to 3.

When slice_cross_component_alf_cr_enabled_flag equals to 1, it is a requirement of bitstream conformance that slice_cross_component_cr_filters_signalled_minus1 shall be less than or equal to the value of alf_cross_component_cr_filters_signalled_minus1 in the referenced ALF APS referred to by slice_cross_component_alf_craps_id of current slice.

In one embodiment of the present invention, pic_cross_component_cb_filters_signalled_minus1, pic_cross_component_cr_filters_signalled_minus1, slice_cross_component_cb_filters_signalled_minus1 and slice_cross_component_cr_filters_signalled_minus1 are not present in the CC-ALF syntax and alf_ctb_cross_component_cb_idc[ ][ ] and alf_ctb_cross_component_cr_idc[ ][ ] are coded in Table 3 as follows:

TABLE 3

| | | |
|---|---|---|
| alf_ctb_cross_component_cb_idc[ ][ ] | TR | cMax = ( alf_cross_component_cb_filters_signalled_minus1 + 1 ), cRiceParam = 0 |
| alf_ctb_cross_component_cr_idc[ ][ ] | TR | cMax = ( alf_cross_component_cr_filters_signalled_minus1 + 1 ), cRiceParam = 0 |

According to the proposed syntax design, the syntaxes, slice_cross_component_cb_filters_signalled_minus1 and slice_cross_component_cr_filters_signalled_minus1 of Table 2 are replaced by alf_cross_component_cb_filters_signalled_minus1 and alf_cross_component_cr_filters_signalled_minus1 respectively in Table 3. In other words, instead of using syntax elements signalled in slice header, the number of filters are signalled in the ALF APS and is directly referenced for defining number of filters coded for CC-ALF. Thus, different from the conventional syntax and signalling, CC-ALF design is aligned with ALF design. Also, since different slices within a picture can refer to different ALF APSs, if number of CC-ALF filters is present in ALF APS, 4 bits per slice can be saved (2 bits per color component).

Any of the foregoing proposed methods can be implemented in encoders and/or decoders. For example, any of the proposed methods can be implemented in an in-loop filtering module of an encoder and/or a decoder. Alternatively, any of the proposed methods can be implemented as a circuit coupled to in-loop filtering module of the encoder and/or the decoder.

Figure 8:
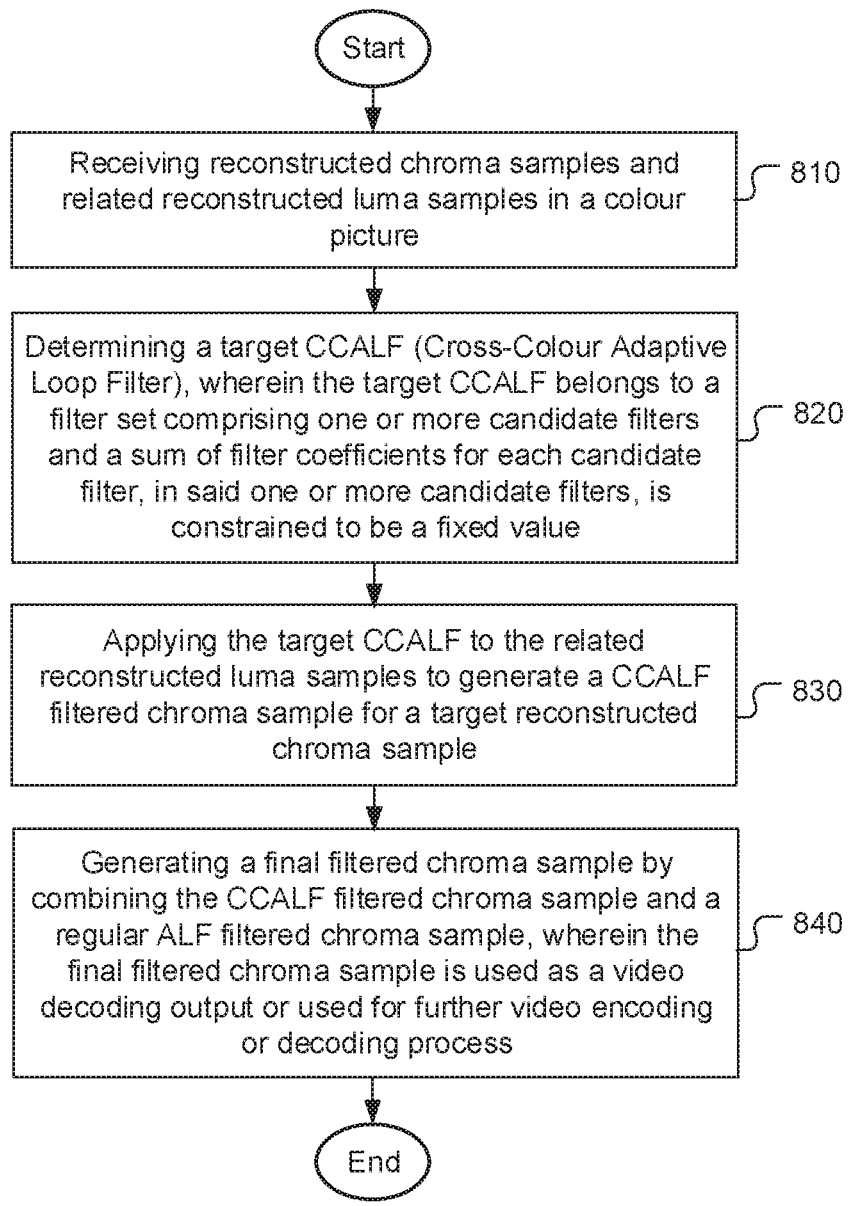
FIG. 8 illustrates a flowchart of an exemplary ALF processing of reconstructed video according to an embodiment of the present invention, where a sum of filter coefficients for each of one or more candidate filters is constrained to be a fixed value.

FIG. 8 illustrates a flowchart of an exemplary ALF processing of reconstructed video according to an embodiment of the present invention, where a sum of filter coefficients for each of one or more candidate filters is constrained to be a fixed value. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, reconstructed samples are received in step 810. A target CCALF (Cross-Colour Adaptive Loop Filter) is determined in step 820, wherein the target CCALF belongs to a filter set comprising one or more candidate filters and a sum of filter coefficients for each candidate filter, in said one or more candidate filters, is constrained to be a fixed value. The target CCALF is applied to the related reconstructed luma samples to generate a CCALF filtered chroma sample for a target reconstructed chroma sample in step 830. A final filtered chroma sample is generated by combining the CCALF filtered chroma sample and a regular ALF filtered chroma sample in step 840, wherein the final filtered chroma sample is used as a video decoding output or used for further video encoding or decoding process.

Figure 9:
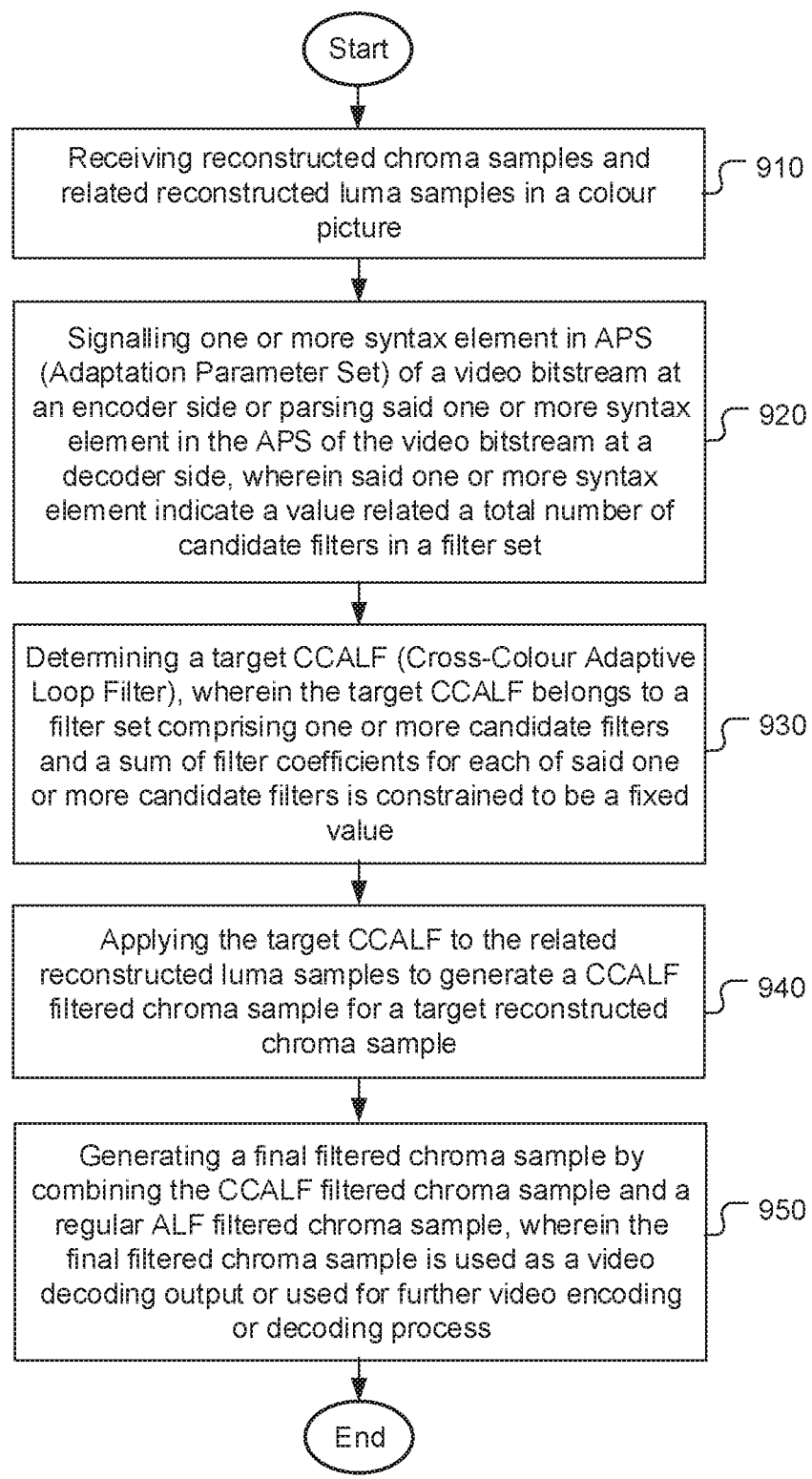
FIG. 9 illustrates a flowchart of an exemplary ALF processing of reconstructed video according to an embodiment of the present invention, where one or more syntax elements indicating a value related to a total number of candidate filters in a filter set are signalled or parsed in the APS (Adaptation Parameter Set).

FIG. 9 illustrates a flowchart of an exemplary ALF processing of reconstructed video according to an embodiment of the present invention, where one or more syntax elements indicating a value related to a total number of candidate filters in a filter set are signalled or parsed in the APS (Adaptation Parameter Set). According to this method, reconstructed samples are received in step 910. One or more syntax element are signalled in APS (Adaptation Parameter Set) of a video bitstream at an encoder side or said one or more syntax elements are parsed in the APS of the video bitstream at a decoder side in step 920, wherein said one or more syntax elements indicate a value related to a total number of candidate filters in a filter set. A target CCALF (Cross-Colour Adaptive Loop Filter) is determined in step 930, wherein the target CCALF belongs to a filter set comprising one or more candidate filters and a sum of filter coefficients for each of said one or more candidate filters is constrained to be a fixed value. The target CCALF is applied to the related reconstructed luma samples to generate a CCALF filtered chroma sample for a target reconstructed chroma sample in step 940. A final filtered chroma sample is generated by combining the CCALF filtered chroma sample and a regular ALF filtered chroma sample in step 950, wherein the final filtered chroma sample is used as a video decoding output or used for further video encoding or decoding process.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for video coding, the method comprising:
receiving reconstructed chroma samples and related reconstructed luma samples in a colour picture;
determining a target CCALF (Cross-Colour Adaptive Loop Filter), wherein the target CCALF belongs to a filter set comprising one or more candidate filters and a sum of filter coefficients for each candidate filter, in said one or more candidate filters, is constrained to be a fixed value;
applying the target CCALF to the related reconstructed luma samples to generate a CCALF filtered chroma sample for a target reconstructed chroma sample; and
generating a final filtered chroma sample by combining the CCALF filtered chroma sample and a regular ALF filtered chroma sample, wherein the final filtered chroma sample is used as a video decoding output or used for further video encoding or decoding process.

2. The method of claim 1, wherein the fixed value is equal to 0.

3. The method of claim 1, wherein when a number of filter coefficients for each candidate filter is equal to M, only (M−1) filter coefficients for each candidate filter are decoded at a decoder side, and wherein the M is an integer greater than 1.

4. The method of claim 3, wherein one filter coefficient, other than the (M−1) filter coefficients, is not decoded at the decoder side or is not encoded at an encoder side, and wherein said one filter coefficient corresponds to any selected coefficient among the filter coefficients for each candidate filter.

5. An apparatus of video coding, the apparatus comprising one or more electronic circuits or processors arranged to:
receive reconstructed chroma samples and related reconstructed luma samples in a colour picture;
determine a target CCALF (Cross-Colour Adaptive Loop Filter), wherein the target CCALF belongs to a filter set comprising one or more candidate filters and a sum of filter coefficients for each of said one or more candidate filters is constrained to be a fixed value;
apply the target CCALF to the related reconstructed luma samples to generate a CCALF filtered chroma sample for a target reconstructed chroma sample; and
generate a final filtered chroma sample by combining the CCALF filtered chroma sample and a regular ALF filtered chroma sample, wherein the final filtered chroma sample is used as a video decoding output or used for further video encoding or decoding process.

6. A method for video coding, the method comprising:
receiving reconstructed chroma samples and related reconstructed luma samples in a colour picture;
signalling one or more syntax elements in APS (Adaptation Parameter Set) of a video bitstream at an encoder side or parsing said one or more syntax elements in the APS of the video bitstream at a decoder side, wherein said one or more syntax elements indicate a value related to a total number of candidate filters in a filter set;
determining a target CCALF (Cross-Colour Adaptive Loop Filter), wherein the target CCALF belongs to the filter set;
applying the target CCALF to the related reconstructed luma samples to generate a CCALF filtered chroma sample for a target reconstructed chroma sample; and
generating a final filtered chroma sample by combining the CCALF filtered chroma sample and a regular ALF filtered chroma sample, wherein the final filtered chroma sample is used as a video decoding output or used for further video encoding or decoding process.

7. The method of claim 6, wherein said one or more syntax elements are signalled or parsed for each colour component.

8. The method of claim 6, wherein said one or more syntax elements comprise a value corresponding to the total number of candidate filters in the filter set minus 1.

9. An apparatus of video coding, the apparatus comprising one or more electronic circuits or processors arranged to:
 receive reconstructed chroma samples and related reconstructed luma samples in a colour picture;
 signal one or more syntax elements in APS (Adaptation Parameter Set) of a video bitstream at an encoder side or parse said one or more syntax elements in the APS of the video bitstream at a decoder side, wherein said one or more syntax elements indicate a value related to a total number of candidate filters in a filter set;
 determine a target CCALF (Cross-Colour Adaptive Loop Filter), wherein the target CCALF belongs to the filter set;
 apply the target CCALF to the related reconstructed luma samples to generate a CCALF filtered chroma sample for a target reconstructed chroma sample; and
 generate a final filtered chroma sample by combining the CCALF filtered chroma sample and a regular ALF filtered chroma sample, wherein the final filtered chroma sample is used as a video decoding output or used for further video encoding or decoding process.

* * * * *